United States Patent [19]

Sugiyama et al.

[11] 4,419,388

[45] Dec. 6, 1983

[54] WATERPROOFING METHOD FOR INK JET RECORDS

[75] Inventors: Masatoshi Sugiyama; Ichiro Nakanishi; Yoshiaki Suzuki, all of Minami-ashigara, Japan

[73] Assignee: Fuji Photo Film Co., Ltd., Kanagawa, Japan

[21] Appl. No.: 312,459

[22] Filed: Oct. 19, 1981

[30] Foreign Application Priority Data

Oct. 17, 1980 [JP] Japan ................................ 55-145341

[51] Int. Cl.[3] .......................... B05D 5/00; B32B 3/00; B32B 27/14; G01D 15/34

[52] U.S. Cl. ................................ 427/288; 346/135.1; 428/195; 428/211; 428/342

[58] Field of Search ..................... 101/126; 346/135.1; 427/264, 270, 271, 288, 391; 428/195, 199, 211, 342

[56] References Cited

U.S. PATENT DOCUMENTS 2,772,184 11/1956 Wolfe et al. .................... 427/391 X
4,269,891 5/1981 Minagawa ...................... 427/146 X
4,290,072 9/1981 Mansukhani .................... 427/335 X

OTHER PUBLICATIONS

Kirk Othmer–Encyclopedia of Chemical Technoloy, 1963, vol. 2, pp. 63, 64, by John Wiley & Sons, Inc.

*Primary Examiner*—Michael R. Lusignan
*Attorney, Agent, or Firm*—Sughrue, Mion, Zinn, Macpeak & Seas

[57] ABSTRACT

A waterproofing method for an ink jet record in a method of recording images on a recording sheet by an ink jet recording method using aqueous ink, comprising forming or applying, on at least the imaged portion of the recording sheet after forming images thereon, a compound represented by the formula $$M^{I}M^{III}(XO_4)_2.12H_2O$$

wherein $M^{I}$ represents a mono-valent metal atom or an ammonium group, $M^{III}$ represents a tri-valent metal atom, and X represents a sulfur atom or a selenium atom.

18 Claims, No Drawings

WATERPROOFING METHOD FOR INK JET RECORDS

FIELD OF THE INVENTION

This invention relates to a waterproofing method for ink jet records, and more particularly to a waterproofing method for ink jet records formed on a recording sheet by aqueous inks.

BACKGROUND OF THE INVENTION

Since ink jet recording makes less noise, can employ high speed recording, and can use plain paper as the recording paper, it has been employed for terminal printers, etc., and recently has been increasingly used for various purposes. Also, multicolor recording can be easily performed, e.g., by using multiple ink nozzles, and multicolor ink jet recording by various ink jet recording systems has been investigated.

Among ink jet recording sheets and mediums used for ink jet recording are wood free papers, slip-writing continuous paper webs, art papers, coated papers, low-density papers without size, ink jet recording papers having relatively good ink absorbing property and showing less blotting of ink as described in Japanese Patent Application (OPI) Nos. 53,012/'77, 74,340/'77 and 49,113/'78 (the term "OPI" as used herein refers to a "published unexamined Japanese patent application"), fabrics, plastic films having ink absorbing surfaces, wood boards, metallic sheets, etc.

Onto such ink jet recording sheets, ink jet recordings are generally formed by application of aqueous inks. Aqueous inks for ink jet recording are typically composed of water-soluble dyes, humectants, dye-solubilizing agents, mold inhibitors, water, and water-miscible organic solvents, as described in Japanese Patent Application (OPI) Nos. 89,534/'74, 97,620/'74, 143,602/'75, 102,407/'75, 129,310/'76, 137,506/'76, 137,505/'76, 115,106/'76, 139,408/'76, 12,008/'77, 12,009/'77, 12,010/'77 and 74,406/'77; Japanese Patent Publication Nos. 14,643/'77 and 14,644/'77; Japanese Patent Application (OPI) Nos. 77,706/'78, 119,107/'78 and 119,108/'78; and Japanese Patent Publication No. 20,882/'78. Examples of the water-soluble dyes include direct dyes, acid dyes, and basic dyes.

Ink jet records obtained by applying conventionally known aqueous inks on the above-described known ink jet recording sheets exhibit the fault that when the records are splashed or wet with water, the records of dyes blot or diffuse completely due to the poor water resistance property thereof. Furthermore, when the records are preserved for a long period of time in a high humidity condition, the ink jet record also blots.

When an ink jet recording paper contains a dyeing component and the amount of jetted ink is small, as in the case of monochromatic ink jet recording, the water resistance properties of the records may be satisfactory for practical purpose if a dye or dyes having good water resistance properties are used. However, in the case of multicolor ink jet recording, the amount of jetted inks is relatively large, and records having sufficient water resistance properties cannot be obtained even when the ink jet recording paper contains good individual dye components. When papers recorded by ink jet printing are used, for example, for outdoor notifications or advertisements, the records are required to have particularly good water resistance properties but multicolor ink jet records formed by the combination of conventional ink jet recording papers and ink jet recording inks have been utterly unsuitable for such practical use.

SUMMARY OF THE INVENTION

An object of this invention is to provide ink jet recording images having high water resistance.

As a result of extensive investigations, it has now been found that in a method of recording images on an ink jet recording sheet using aqueous ink jet recording, the ink jet records can be easily rendered waterproof by forming or applying on at least the imaged portions of the recording sheet after forming images thereon, a compound (e.g., alum) represented by the formula $$M^{I}M^{III}(XO_4)_2.12H_2O$$

wherein $M^I$ represents a mono-valent metal atom or an ammonium group; $M^{III}$ represents a tri-valent metal atom; and X represents a sulfur atom or a selenium atom.

DESCRIPTION OF THE PREFERRED EMBODIMENT

Examples of the mono-valent atom $M^I$ in the foregoing general formula are sodium, potassium, rubidium, cesium, thallium, etc., and examples of the tri-valent metal atom $M^{III}$ are aluminum, gallium, indium, titanium, vanadium, chromium, manganese, iron, cobalt, iridium, rhodium, etc.

Practical examples of the compounds shown by the foregoing general formula are as follows:

| Compound (1) | $NaAl(SO_4)_2.12H_2O$ |
|---|---|
| Compound (2) | $KAl(SO_4)_2.12H_2O$ |
| Compound (3) | $NH_4Al(SO_4)_2.12H_2O$ |
| Compound (4) | $RbAl(SO_4)_2.12H_2O$ |
| Compound (5) | $CsAl(SO_4)_2.12H_2O$ |
| Compound (6) | $NH_4Fe(SO_4)_2.12H_2O$ |
| Compound (7) | $NH_4Cr(SO_4)_2.12H\ O$ |
| Compound (8) | $KCr(SO_4)_2.12H_2O$ |
| Compound (9) | $NaCr(SO_4)_2.12H_2O$ |
| Compound (10) | $TlCr(SeO_4)_2.12H_2O$ |
| Compound (11) | $NaMn(SO_4)_2.12H_2O$ |
| Compound (12) | $KCo(SO_4)_2.12H_2O$ |

It is known that an alum is a double salt formed by mixing a sulfate of a mono-valent metal and a sulfate of a tri-valent metal in an aqueous solution at the ratio of the chemical formula shown in the foregoing general formula and slowly evaporating off the water (see, *Encyclopaedia Chemica,* vol. 9, page 41 (1975), published by Kyoritsu Shuppan K.K.). Therefore, as a method of forming an alum as a water-proofing agent on the imaged portions, the alum can be formed as a waterproofing agent solely on the imaged portions by incorporating a sulfate of a mono-valent metal for forming the alum in an ink, and conducting an ink jet printing on a recording sheet previously coated with a sulfate of a tri-valent metal for forming the alum using the ink.

The molar concentration of the sulfate of mono-valent metal for forming the alum is typically from 0.5 to 5 times, and preferably from 0.8 to 2 times, the molar concentration of a water-soluble dye compound in the ink. Also, the coating amount of the sulfate of tri-valent metal for forming the alum on a sheet or paper is from 5 g/m$^2$ to 100 g/m$^2$, and preferably from 10 g/m$^2$ to 50 g/m$^2$. The sulfate of tri-valent metal for forming the alum may be coated on the paper or other recording sheet together with a water-soluble polymer and a pigment having dye absorbing property.

For applying the alum as a waterproofing agent on an ink jet recording sheet, coating by spray coating, roll coating, gravure coating, etc., is suitable.

The waterproofing agent may be sprayed through an ink jet nozzle used for ink jet recording. In this case, the water-proofing agent can be selectively applied to the ink jet recorded portions only.

After applying the waterproofing agent, it may be dried, if desired, by hot air, infrared rays, etc.

The waterproofing agent is generally applied in an amount of 5 $g/m^2$ to 50 $g/m^2$ as a solution thereof but if the amount is too large, it sometimes occurs that the ink jet recorded images blot, and hence the application amount thereof is as small as is practically possible.

The ink jet recording sheets used in this invention are, e.g., low-density papers without size, wood free papers, art papers, coated papers, ink jet recording papers having good ink absorbing property and showing less blotting of ink as described in Japanese Patent Application (OPI) Nos. 53,012/'77, 74,340/'77 and 49,113/'78, water-soluble polymer coated papers, papers coated with pigments having dye adsorbing property, fabrics, plastic films having ink absorbing surfaces, wood boards, metallic sheets, etc.

The advantages of this invention include the points of easily obtaining ink jet records having high water resistance and of improving the light fastness of ink jet records. Preferred examples of the dyes used in the ink jet recording of this invention are acid dyes, direct dyes, and water-soluble metal chelate dyes having a sulfonic acid group or a carboxyl group. The acid dyes, direct dyes, and water-soluble metal chelate dyes having a sulfonic acid group or a carboxyl group which can be used in this invention are not particularly limited. But, those acid dyes and direct dyes as disclosed in e.g., Japanese Patent Application (OPI) Nos. 89,811/'79 and 65,268/'80, and those water-soluble metal chelate dyes having a sulfonic acid group or a carboxyl group as disclosed in, e.g., Japanese Patent Application (OPI) No. 144,065/'79 and Japanese Patent Publication No. 16,243/'79 are useful in this invention.

The invention will be explained in more detail by reference to the following examples.

EXAMPLE 1

An ink jet recording paper having a density of 0.7 $g/cm^2$ and a basis weight of 100 $g/m^2$ was prepared using a mixture of 100 parts of wood pulp and 0.5 parts of a polyamide-polyamine-epichlorohydrin resin. Using the recording paper, multicolor ink jet recording was performed using 4-color aqueous inks each containing Direct Blue 86, Acid Red 73, Acid Yellow 26, and Direct Black 155, respectively. After finishing the ink jet recording, an aqueous solution of 2% by weight of Compound (2) as indicated hereinbefore was spray coated on the record as a waterproofing agent at a coverage of 10 $ml/m^2$ and thereafter dried by hot air.

When the ink jet recorded paper thus waterproofed was immersed in water for one hour at 20° C., no dissolution of dye was observed, while in the case of conventional ink jet recording papers, the dyes were mostly dissolved to remove the recorded images.

EXAMPLE 2

An ink jet recording paper was prepared by coating a coating composition containing 100 parts of calcium carbonate and 30 parts of gelatin on one surface of a sized base paper having a basis weight of 100 $g/m^2$ at a solid content coverage of 10 $g/m^2$. Then, monochromatic ink jet recording was applied by jetting an aqueous ink containing Direct Black 155 onto the ink jet recording paper. During the ink jet recording, an aqueous solution of 1% by weight of Compound (7) was sprayed on the whole surface of the recording paper as a waterproofing agent through a separate nozzle from the image recording nozzle. The spraying amount of the waterproofing agent was 10 $ml/m^2$. When the ink jet recorded paper was immersed in water in the same manner as in Example 1, the ink jet recording paper thus waterproofed showed no disappearance of the recorded image, while in the case of an ink jet recording paper which was not subjected to the waterproofing treatment, the recorded image did disappear.

EXAMPLE 3

An ink jet recording paper was prepared by coating a mixture of 5 $g/m^2$ of gelatin (solid content) and 10 $g/m^2$ of aluminum sulfate as a component sulfate of Compound (3) on a sized base paper having a basis weight of 100 $g/m^2$. Then, ink jet recording was applied onto the ink jet recording paper thus prepared using an aqueous ink containing Direct Black 38 and ammonium sulfate, the second component sulfate of Compound (3) in an amount of 2 molar times the amount of Direct Black 38 contained in the aqueous ink.

When the ink jet recorded paper was subjected to the waterproofing test in the same manner as in Example 1, the recorded image did not disappear when the ink jet recorded paper was immersed in water.

While the invention has been described in detail and with reference to specific embodiments thereof, it will be apparent to one skilled in the art that various changes and modifications can be made therein without departing from the spirit and scope thereof.

What is claimed is:

1. A waterproofing method for an ink jet record in a method of recording images on a recording sheet by an ink jet recording method using aqueous ink, comprising applying on at least the imaged portion of the recording sheet after forming images thereon, a compound represented by the formula $$M^{I}M^{III}(XO_4)_2.12H_2O$$

wherein $M^I$ represents a mono-valent metal atom or an ammonium group, $M^{III}$ represents a tri-valent metal atom, and X represents a sulfur atom or a selenium atom.

2. A waterproofing method for an ink jet record as in claim 1, wherein said compound is applied to the whole surface of the recording sheet after forming the ink jet record thereon.

3. A waterproofing method for an ink jet record as in claim 1, wherein said compound is applied onto the ink jet record formed on the recording sheet through a nozzle of the same ink jet printer used for forming the ink jet record.

4. A waterproofing method as in claim 1, 2, or 3, wherein $M^I$ is selected from the group consisting of sodium, potassium, rubidium, cesium and thallium, and $M^{III}$ is selected from the group consisting of aluminum, gallium, indium, titanium, vanadium, chromium, manganese, iron, cobalt, iridium and rhodium.

5. A waterproofing method for an ink jet record in a method of recording images on a recording sheet by an ink jet recording method using aqueous ink, comprising forming on at least the imaged portion of the recording sheet after forming images thereon, a compound represented by the formula $$M^{I}M^{III}(XO_4)_2.12H_2O$$

wherein $M^I$ represents a mono-valent metal atom or an ammonium group, $M^{III}$ represents a tri-valent metal atom, and X represents a sulfur atom or a selenium atom.

6. A waterproofing method as in claim 1, 2, 3 or 5, wherein X represents a sulfur atom.

7. A waterproofing method as in claim 4, wherein X represents a sulfur atom.

8. A waterproofing method for an ink jet record as in claim 5, wherein a sulfate or a tri-valent metal for forming said compound is applied on the surface of a recording sheet for forming ink jet records, and a sulfate of a mono-valent metal for said compound is jetted from a nozzle of the ink jet printer together with an aqueous ink jet recording ink.

9. A waterproofing method as in claim 8, wherein the sulfate of the tri-valent metal is coated on the recording sheet in a concentration of from 5 $g/m^2$ to 100 $g/m^2$.

10. A waterproofing method as in claim 8, wherein the sulfate of the tri-valent metal is coated on the recording sheet in a concentration of from 10 $g/m^2$ to 50 $g/m^2$.

11. A waterproofing method as in claim 8, 9 or 10, wherein the sulfate of the tri-valent metal is coated onto the recording sheet in a solution including a water-soluble polymer and a pigment having a dye absorbing property.

12. A waterproofing method as in claim 1, 2, 3 or 5, wherein the compound is formed or applied on the recording sheet in a concentration of from 5 $g/m^2$ to 50 $g/m^2$.

13. A waterproofing method as in claim 4, wherein the compound is formed or applied on the recording sheet in a concentration of from 5 $g/m^2$ to 50 $g/m^2$.

14. A waterproofing method as in claim 6, wherein the compound is formed or applied on the recording sheet in a concentration of from 5 $g/m^2$ to 50 $g/m^2$.

15. A waterproofing method as in claim 7, wherein the compound is formed or applied on the recording sheet in a concentration of from 5 $g/m^2$ to 50 $g/m^2$.

16. A waterproofing method as in claim 8, wherein the compound is formed on the recording sheet in a concentration of from 5 $g/m^2$ to 50 $g/m^2$.

17. A waterproofing method as in claim 9 or 10, wherein the compound is formed on the recording sheet in a concentration of from 5 $g/m^2$ to 50 $g/m^2$.

18. A waterproofing method as in claim 11, wherein the compound is formed on the recording sheet in a concentration of from 5 $g/m^2$ to 50 $g/m^2$.

* * * * *